US008627864B2

(12) United States Patent
Ochi et al.

(10) Patent No.: US 8,627,864 B2
(45) Date of Patent: Jan. 14, 2014

(54) PNEUMATIC TIRE WITH TREAD HAVING LUG GROOVES AND SUB-GROOVES

(75) Inventors: Naoya Ochi, Kodaira (JP); Tomoaki Nemoto, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 134 days.

(21) Appl. No.: 13/054,375

(22) PCT Filed: Jul. 14, 2009

(86) PCT No.: PCT/JP2009/062755
§ 371 (c)(1),
(2), (4) Date: Apr. 27, 2011

(87) PCT Pub. No.: WO2010/007996
PCT Pub. Date: Jan. 21, 2010

(65) Prior Publication Data
US 2011/0192514 A1    Aug. 11, 2011

(30) Foreign Application Priority Data

Jul. 16, 2008    (JP) ................................ 2008-185443

(51) Int. Cl.
*B60C 11/11*    (2006.01)
*B60C 11/12*    (2006.01)

(52) U.S. Cl.
USPC ............. 152/209.27; 152/209.28; 152/DIG. 3

(58) Field of Classification Search
USPC .............. 152/209.18, 209.27, 209.28, DIG. 3
IPC ............................................ B60C 11/11,11/12
See application file for complete search history.

(56) References Cited

U.S. PATENT DOCUMENTS 6,571,844 B1    6/2003 Ochi et al.

2006/0118222 A1    6/2006 Ebiko

FOREIGN PATENT DOCUMENTS

| JP | 05-301508 | * | 11/1993 | .............. B60C 11/12 |
|---|---|---|---|---|
| JP | 9-193616 | A | 7/1997 | |
| JP | 2000-108615 | A | 4/2000 | |
| JP | 2000-225814 | A | 8/2000 | |
| JP | 2000-255217 | A | 9/2000 | |
| JP | 2001-030720 | A | 2/2001 | |
| JP | 2001-191740 | * | 7/2001 | .............. B60C 11/11 |
| JP | 2002-248909 | A | 9/2002 | |
| JP | 2002-274126 | A | 9/2002 | |

(Continued)

OTHER PUBLICATIONS

Machine Translation: JP2003-237318A; Ochi, Naoya; (no date).*
Machine Translation: JP2001-191740A; Ochi, Naoya; (no date).*

(Continued)

*Primary Examiner* — Steven D Maki
*Assistant Examiner* — Kendra Shin
(74) *Attorney, Agent, or Firm* — Sughrue Mion, PLLC

(57) ABSTRACT

A pneumatic tire comprising: a pair of center circumferential direction grooves, first lug grooves that connect to the center circumferential direction grooves and the directions of inclination of which is alternately in opposite directions in the tire circumferential direction, second lug grooves that extend from the center circumferential direction grooves to the edges of the tread and the directions of inclination are in opposite directions on one side and the other side across the equator in the tire width direction, a pair of shoulder circumferential direction grooves that delineate second blocks with the center circumferential direction grooves and the second lug grooves, and sub-grooves that traverse the second blocks in the tire circumferential direction to connect the second lug grooves, and extend in a direction that is orthogonal to the direction of inclination of the second lug grooves.

4 Claims, 2 Drawing Sheets

(56) References Cited

FOREIGN PATENT DOCUMENTS

| | | | | |
|---|---|---|---|---|
| JP | 2003-237318 | * | 8/2003 | ............ B60C 11/11 |
| JP | 2003-237318 A | | 8/2003 | |
| JP | 2008-120232 A | | 5/2008 | |
| WO | 2005/005170 A1 | | 1/2005 | |

OTHER PUBLICATIONS

Machine Translation: JP05-301508; Shinohara, Kazuaki; (no date).*
International Search Report for International Application No. PCT/JP2009/062755 dated Oct. 13, 2009.
Korean Office Action dated Sep. 17, 2012 issued in Korean Patent Application No. 10-2011-7003346.

* cited by examiner

PNEUMATIC TIRE WITH TREAD HAVING LUG GROOVES AND SUB-GROOVES

CROSS REFERENCE TO RELATED APPLICATIONS

This application is a National Stage of International Application No. PCT/JP2009/062755 filed Jul. 14, 2009, which claims priority from Japanese Patent Application No. 2008-185443 filed Jul. 16, 2008, the contents of all of which are incorporated herein by reference in their entirety.

TECHNICAL FIELD

The present invention relates to a pneumatic tire and, in particular, relates to a pneumatic tire that is excellent in performance on snow.

BACKGROUND ART

In a conventional pneumatic tire, in order to improve performance on snow, there has been adopted a tread pattern comprising circumferential direction wide-width grooves that are provided at both sides with a tire equatorial plane interposed therebetween and that form a circumferential direction rib, circumferential direction narrow-width grooves that are provided at tire width direction outer sides of the circumferential direction wide-width grooves, transverse grooves that traverse the circumferential direction wide-width grooves and the circumferential direction narrow-width grooves, and sub-grooves that substantially divide into halves rhomboid land portions delineated by the circumferential direction wide-width grooves, the circumferential direction narrow-width grooves and the transverse grooves (for example, refer to Patent Document 1). In the pneumatic tire of Patent Document 1, due to the combination of the circumferential direction wide-width grooves and the circumferential direction narrow-width grooves, straight traveling stability and cornering performance are improved, by setting an angle of inclination of the transverse grooves with respect to the tire circumferential direction, traction performance on snow is improved, and due to the sub-grooves that substantially divide into halves the rhomboid land portions, cornering performance on snow is improved.

Patent Document 1: Japanese Patent Application Laid-Open (JP-A) No. 2000-255217

DISCLOSURE OF INVENTION

Technical Problem

However, in the market, further improvement of performance on snow is expected.

In view of the above-described circumstances, an object of the present invention is to provide a pneumatic tire that can improve traction performance, braking performance and cornering performance on snow.

Solution to Problem

A pneumatic tire according to a first aspect of the present invention comprises: a pair of center circumferential direction grooves that are provided at both tire width direction sides with a tire equatorial plane interposed therebetween, and that extend in a tire circumferential direction; a plurality of first lug grooves that connect one of the center circumferential direction grooves and the other of the center circumferential direction grooves, and that are inclined with respect to a tire width direction, directions of inclination of the plurality of first lug grooves being alternately in opposite directions in the tire circumferential direction; a plurality of second lug grooves that are provided at both tire width direction sides with the tire equatorial plane interposed therebetween, extend from the center circumferential direction grooves to tread edge sides, and are inclined with respect to the tire width direction, directions of inclination of the plurality of second lug grooves being in opposite directions on one side and the other side in the tire width direction across the tire equatorial plane; a pair of shoulder circumferential direction grooves that are provided at tire width direction outer sides of the center circumferential direction grooves with the tire equatorial plane interposed therebetween, extend in the tire circumferential direction, and delineate second blocks together with the center circumferential direction grooves and the second lug grooves; and sub-grooves that traverse the second blocks in the tire circumferential direction to connect one of the second lug grooves and another of the second lug grooves, and that extend along a direction that is orthogonal to the direction of inclination of the second lug grooves.

In the pneumatic tire according to a first aspect of the present invention, a plurality of blocks (a circumferential direction block row) are delineated at a tread center portion by the center circumferential direction grooves and the first lug grooves. As a result, compared with a tire in which a block row is not delineated between center circumferential direction grooves, circumferential direction edge components are increased, and braking performance and traction performance on snow are improved.

Further, due to the second blocks being divided by the sub-grooves, width direction edge components are increased, and lateral sliding on snow is suppressed to improve traction performance at the time of cornering, that is, to improve cornering performance on snow.

In this regard, by inclining the sub-grooves along a direction that is orthogonal to the direction of inclination of the second lug grooves, sub-groove side corner portions of the second blocks divided by the sub-grooves become substantial right angles in planar view, and, for example, compared to a case where the corner portions become sharp angles in planar view, rigidity of the corner portions in the tire width direction is secured. As a result, at the time of cornering on snow, rigidity of the second blocks in the tire width direction is secured, and sufficient cornering performance can be exerted.

In a pneumatic tire according to a second aspect of the present invention, a groove width of the sub-grooves is set to be narrower than that of a center circumferential direction grooves and that of a shoulder circumferential direction grooves, and so as not to close at a time of contact with the ground.

In the pneumatic tire according to a second aspect of the present invention, since the groove width of the sub-grooves is narrower than that of the center circumferential direction grooves and that of the shoulder circumferential direction grooves, reduction in an area of contact with the ground is suppressed. Further, since the groove width of the sub-grooves is set so as not to close at the time of contact with the ground, width direction edge components on snow can be secured.

In a pneumatic tire according to a third aspect and a fourth aspect of the present invention, the sub-grooves on the one side and the sub-grooves on the other side in the tire width direction across the tire equatorial plane are arranged to be offset from each other in the tire circumferential direction, and, viewed from the tire width direction, at least a portion of the sub-grooves on the one side and at least a portion of the sub-grooves on the other side overlap with each other.

In the pneumatic tire according to a third aspect and a fourth aspect of the present invention, since the sub-grooves on the one side and the sub-grooves on the other side in the tire width direction across the tire equatorial plane are arranged to be offset from each other in the tire circumferential direction, and, viewed from the tire width direction, at least a portion of the sub-grooves on the one side and at least a portion of the sub-grooves on the other side overlap with each other, an edge effect is always obtained by the sub-grooves within a surface of contact with the ground. Further, since edge components of the sub-grooves on the one side and edge components of the sub-grooves on the other side in the tire width direction come close to being uniform within the surface of contact with the ground, steering stability is secured.

Advantageous Effects of Invention

As explained above, the pneumatic tire of the present invention can improve braking performance, traction performance and cornering performance on snow.

BEST MODE FOR CARRYING OUT THE INVENTION

First Exemplary Embodiment

A first exemplary embodiment of a pneumatic tire of the present invention will be explained in accordance with FIG. 1. It should be noted that in FIG. 1, an arrow L direction and an arrow R direction indicate a tire width direction, an arrow A direction indicates a tire rotation direction, and an arrow B direction indicates a traveling direction of the tire. Further, the pneumatic tire of the present exemplary embodiment is a studless tire (winter tire) which is preferably used for a light truck (LT).

It should be noted that tread edges 12E, which will be described later, indicate tire width direction outermost ground contact portions when the pneumatic tire is mounted to a standard rim, as defined in the JATMA YEAR BOOK (2008 edition, Japan Automobile Tire Manufacturers Association standards), filled to an internal pressure of 100% of an air pressure (maximum air pressure) corresponding to a maximum load capability (load shown in bold type in the internal pressure-load capability correspondence chart) in the applicable size/ply rating in the JATMA YEAR BOOK, and loaded with the maximum load capability. It should be noted that in cases where TRA standards or ETRTO standards are applied to a location of use or manufacturing location, accordance is made to the respective standards.

Figure 1:
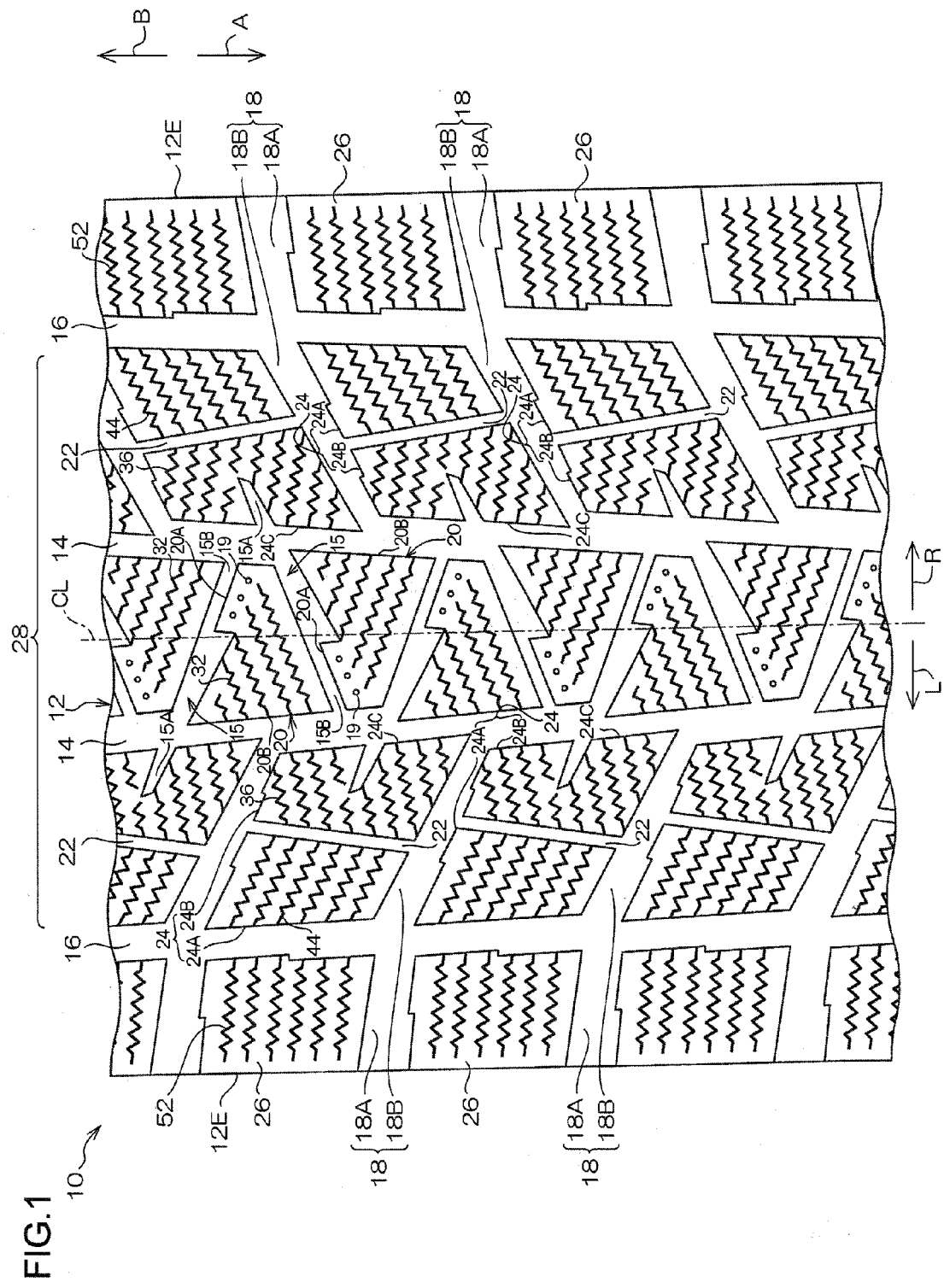
FIG. 1 is a plan view of tread of a pneumatic tire of a first exemplary embodiment.

As shown in FIG. 1, in a tread 12 of a pneumatic tire 10 of the first exemplary embodiment, there are formed a pair of center circumferential direction grooves 14 that extend along a tire circumferential direction at both tire width direction sides with a tire equatorial plane CL interposed therebetween and a pair of shoulder circumferential direction grooves 16 that extend along the tire circumferential direction at tire width direction outer sides of the center circumferential direction grooves 14 with the tire equatorial plane CL interposed therebetween.

In the tread 12, plural first lug grooves 15 that connect one of the center circumferential direction grooves 14 (on an arrow L direction side in FIG. 1) and the other of the center circumferential direction grooves 14 (on an arrow R direction side in FIG. 1) are formed at intervals in the tire circumferential direction. The first lug grooves 15 are inclined with respect to the tire width direction and are arranged so that directions of inclination thereof are alternately in opposite directions in the tire circumferential direction. Further, in the tread 12, plural second blocks 20 (which are substantially triangular shaped in planar view) are delineated by the center circumferential direction grooves 14 and the first lug grooves 15 and are arranged along the tire circumferential direction. Further, in the present exemplary embodiment, directions of inclination of the first lug grooves 15 extend so as to be inclined from a side of the tread 12 where ground contact is first made (hereinafter, first ground contact side) toward a side thereof where ground contact is later made (hereinafter, later ground contact side) (that is, extend so as to be inclined in the tire width direction from the bottom toward the top in FIG. 1).

Further, end portions 15A (in FIG. 1, all are upper end portions) at the later ground contact side of the first lug grooves 15 of the present exemplary embodiment terminate within second blocks 24, which will be described later. Specifically, the later ground contact sides of the first lug grooves 15 pass through tire circumferential direction central portions of wall faces 24 at the tire equatorial plane CL side of the second blocks 24, and the end portions 15A terminate within the second blocks 24. Moreover, groove widths of end portions 15B at the first ground contact side of the first lug grooves 15 are narrow. Specifically, portions of the center blocks 20 that correspond to the end portions 15B of the first lug grooves 15 protrude, and at a tread face of these protrusion portions 20A, plural pin-shaped pin sipes 19 that extend in a groove depth direction are formed. Due to the protrusion portions 20A being provided, rigidity surrounding the protrusion portions 20A of the center blocks 20 is improved.

Further, in the tread 12, plural second lug grooves 18 that extend from the tread edge 12E on the one side in the tire width direction (the arrow L direction side in FIG. 1) and from the tread edge 12E on the other side in the tire width direction (the arrow R direction side in FIG. 1) respectively toward the tire equatorial plane CL are formed. The second lug grooves 18 traverse the shoulder circumferential direction grooves 16 and are open at the center circumferential direction grooves 14. Specifically, the second lug grooves 18 are configured by second lug groove outer side portions 18A disposed from the tread edges 12E to the shoulder circumferential direction grooves 16 and second lug groove inner side portions 18B disposed from the shoulder circumferential direction grooves 16 to the center circumferential direction grooves 14. Further, in the tread 12, plural second blocks 24 are delineated by the center circumferential direction grooves 14, the shoulder circumferential direction grooves 16 and the second lug groove inner side portions 18B and are arranged along the tire circumferential direction, and furthermore, plural shoulder blocks 26 are delineated by the shoulder circumferential direction grooves 16 and the second lug groove outer side portions 18A and are arranged along the tire circumferential direction. Further, in the present exemplary embodiment, directions of inclination of the second lug grooves 18 extend so as to be inclined from the first ground contact side toward the later ground contact side of the tread 12 (that is, extend so as to be inclined in the tire width direction from the bottom toward the top in FIG. 1), similarly to the directions of inclination of the first lug grooves 15.

Further, in the present exemplary embodiment, although the angles of inclination with respect to the tire width direction are configured to be larger at the second lug groove inner side portions 18B than at the second lug groove outer side portions 18A, the present invention is not limited to this configuration, and the angles of inclination of the second lug groove outer side portions 18A and the second lug groove inner side portions 18B, with respect to the tire width direction may be the same, that is, the second lug grooves 18 may have a substantially straight line shape.

Further, the second lug grooves 18 extending from the tread edge 12E on the arrow L direction side and the second lug grooves 18 extending from the tread edge 12E on the arrow R direction side are inclined in opposite directions from each other with respect to the tire equatorial plane CL. As a result, water on a road surface can be efficiently discharged outside of a surface of contact with the ground via the second lug grooves 18 at the time of traveling on a wet road surface.

Further, in the tread 12, sub-grooves 22 that traverse the second blocks 24 to connect one of the second lug grooves 18 and another of the second lug grooves 18 (specifically, the second lug groove inner side portions 18B) are formed. The sub-grooves 22 are inclined in the tire circumferential direction, and directions of inclination thereof are along a direction that is orthogonal to the directions of inclination of the second lug grooves 18. It should be noted that being inclined along a direction that is orthogonal to the directions of inclination of the second lug grooves 18, as referred to herein, includes an angular difference between the directions of inclination of the second lug grooves 18 and the directions of inclination of the sub-grooves 22 being within a range of as much as ±20 degrees. Incidentally, a more preferable range of this angular difference is ±10 degrees. Further, a groove width of the sub-grooves 22 is configured to be narrower than groove widths of the center circumferential direction grooves 14 and the shoulder circumferential direction grooves 16, and so as not to close at a time of contact with the ground.

Further, the sub-grooves 22 on the one side and the sub-grooves 22 on the other side in the tire width direction across the tire equatorial plane CL are arranged to be offset from each other in the tire circumferential direction, and, viewed from the tire width direction, at least a portion of the sub-grooves 22 on the one side and at least a portion of the sub-grooves 22 on the other side overlap with each other. It should be noted that, in the present exemplary embodiment, the sub-grooves 22 on the one side and the sub-grooves 22 on the other side overlap with each other by at least half in the tire circumferential direction, viewed from the tire width direction. That is to say, in the present exemplary embodiment, since the first lug grooves 15 are formed so as to connect the one of the center circumferential direction grooves 14 and the other of the center circumferential direction grooves 14 and be inclined with respect to the tire width direction, and so that directions of inclination thereof are alternately in opposite directions in the tire circumferential direction, and the sub-grooves 22 are formed at substantially right angles to the first lug grooves 15 in extending directions toward a later ground contact edge side of the first lug grooves 15 (toward a direction where ground contact occurs later when the tire rotates in the tire rotation direction A), one of the sub-grooves 22 and another of the sub-grooves 22 overlap with each other in the tire circumferential direction, viewed from the tire width direction.

It should be noted that a tread center portion 28, as referred to herein, indicates an area between the one shoulder circumferential direction groove 16 and the other shoulder circumferential direction groove 16.

Further, in the pneumatic tire 10 of the present exemplary embodiment, flow of water in the center circumferential direction grooves 14 at the time of traveling on a wet road surface is in the arrow B direction, and since water flows in the arrow B direction in the center circumferential direction grooves 14, and a portion thereof flows toward the second lug grooves 18 to be discharged outside of the contact surface, it is preferable that the groove width of the second lug grooves 18 becomes gradually wider from the center circumferential direction grooves 14 toward the tread edges 12E.

In the center blocks 20, zigzag-shaped sipes 32 extend from a wide-width face 20B (corresponding to a base of the triangle) of the center block 20 toward the tire equatorial plane CL. The sipes 32 are provided so that center lines thereof are parallel to the first lug groove 15 on the first ground contact side (in FIG. 1, the first lug groove 15 at the lower side of the center block 20).

In outer side second blocks 24A at the tire width direction outer side within the second blocks 24 divided by the sub-grooves 22, zigzag-shaped sipes 44 are provided parallel to the second lug groove inner side portions 18B. Further, in inner side second blocks 24B at the tire width direction inner side within the second blocks 24, sipes 36 extending in the tire width direction are provided. Moreover, in the shoulder blocks 26, zigzag-shaped sipes 52 are provided parallel to the second lug groove outer side portions 18A.

(Operation)

Next, operation of the pneumatic tire 10 of the present exemplary embodiment will be explained.

According to the pneumatic tire 10, the plural center blocks 20 (the circumferential direction block row) are delineated in the tread center portion 28 by the center circumferential direction grooves 14 and the first lug grooves 15. As a result, compared with a tire in which a block row is not delineated between the center circumferential direction grooves 14, circumferential direction edge components are increased, and braking performance and traction performance on snow are improved.

Further, due to the second blocks 24 being divided by the sub-grooves 22, width direction edge components are increased, and lateral sliding on snow is suppressed to improve traction performance at the time of cornering, that is, to improve cornering performance on snow.

In this regard, by inclining the sub-grooves 22 along a direction that is orthogonal to the direction of inclination of the second lug grooves 18, the sub-groove 22 side corner portions of the second blocks 24 (the outer side second blocks 24A and the inner side second blocks 24B) divided by the sub-grooves 22 become substantial right angles in planar view, and, for example, compared to a case where the corner portions become sharp angles in planar view, rigidity of the corner portions in the tire width direction is secured. As a result, at the time of cornering on snow, rigidity of the second blocks in the tire width direction is secured, and sufficient cornering performance can be exerted.

Further, since the groove width of the sub-grooves 22 is narrower than that of the center circumferential direction grooves 14 and that of the shoulder circumferential direction grooves 16, reduction in an area of contact with the ground is suppressed. Further, since the groove width of the sub-grooves 22 is set so as not to close at the time of contact with the ground, width direction edge components on snow can be secured.

Furthermore, since the sub-grooves 22 on the one side and the sub-grooves 22 on the other side in the tire width direction across the tire equatorial plane CL are arranged to be offset from each other in the tire circumferential direction, and, viewed from the tire width direction, at least a portion of the sub-grooves 22 on the one side and at least a portion of the sub-grooves 22 on the other side overlap with each other, an edge effect is always obtained by the sub-grooves 22 within the surface of contact with the ground. Further, since edge components of the sub-grooves 22 on the one side and edge components of the sub-grooves 22 on the other side in the tire width direction come close to being uniform within the surface of contact with the ground, steering stability is secured.

Further, as shown in FIG. 1, in the pneumatic tire 10, the directions of inclination of the second lug grooves 18 are different (are opposite directions), and the directions of inclination of the sub-grooves 22 are different, at both sides of the tire equatorial plane CL, whereby the tread pattern becomes a directional pattern, and therefore, high wet performance (hydroplaning properties) are obtained.

Further, in the tread 12, since the pair of center circumferential direction grooves 14 and the pair of shoulder circumferential direction grooves 16 are provided, high straight traveling stability and cornering performance on snow are obtained.

Further, in the tread 12, since the plural second lug grooves 18 extending from both tread edges 12E toward the center circumferential direction grooves 14 are arranged in the tire circumferential direction, high traction performance and braking performance are obtained.

Since the groove width of the second lug grooves 18 is configured to be narrower at the center circumferential direction groove 14 side than at both tread edge 12E sides, a negative rate of the tread center portion 28 having a relatively high ground contact pressure can be lowered, and high braking performance on ice can be obtained.

Further, in the pneumatic tire 10 of the present exemplary embodiment, the sipes 32 and the pin sipes 19 are formed in the center blocks 20 of the tread 12, the sipes 36 and 44 are formed in the second blocks 24, and the sipes 52 are formed in the shoulder blocks 26, and therefore, high performance on ice and snow can be obtained.

Furthermore, since the sipes 32, 36, 44 and 52 are each zigzag shaped, edge components in both the tire circumferential direction and the tire width direction can be increased, whereby particularly cornering performance on ice can be improved.

Moreover, since the sipes 32, 36, 44 and 52 are zigzag shaped, and a shape in which a locus of oscillation centers is made to be continuous is configured as a straight line shape, blades (plates that form the sipes) of a mold that forms the pneumatic tire 10 become easier to manufacture.

Figure 2:
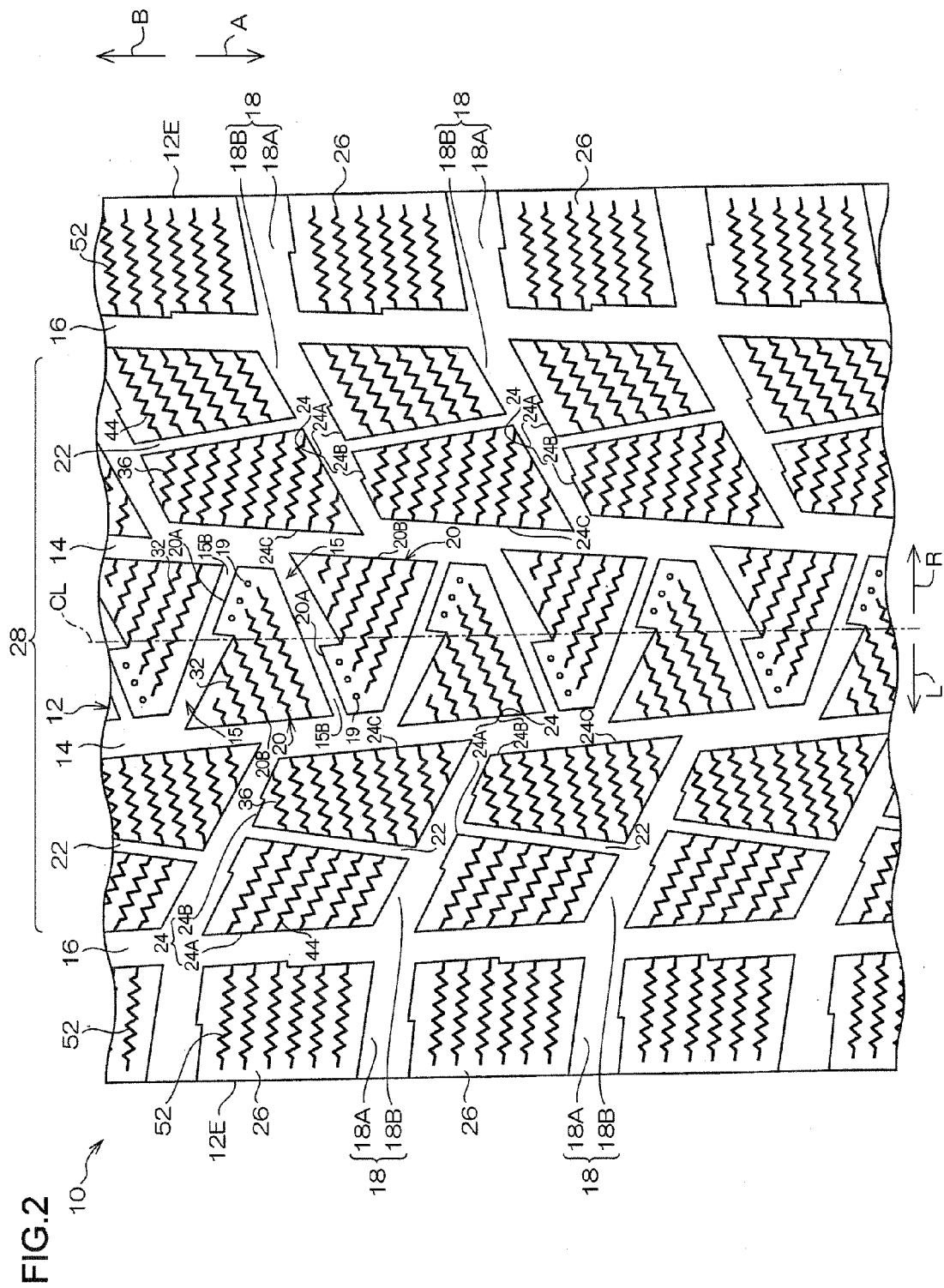
FIG. 2 is a plan view of tread of a modified example of the pneumatic tire of the first exemplary embodiment.

In the first exemplary embodiment, although a configuration is provided in which the end portions 15A of the first lug grooves 15 terminate within the second blocks 24, there is no need for the present invention to be limited to this configuration, and as shown in FIG. 2, a configuration may be provided in which the end portions 15A of the first lug grooves 15 do not terminate within the second blocks 24.

In the foregoing, although embodiments of the present invention have been explained by way of exemplary embodiments, these exemplary embodiments are one example, and the present invention can be implemented by making various modifications within a range that does not deviate from the gist thereof. Further, it goes without saying that the scope of rights for the present invention is not limited by these exemplary embodiments.

Test Examples

In order to confirm the effects of the present invention, the present inventors prepared one type of the pneumatic tire according to the first exemplary embodiment (hereinafter, referred to as the Example tire), two types of pneumatic tires for comparison (hereinafter, referred to as the Comparative Example tires), and one type of conventional pneumatic tire (hereinafter, referred to as the Conventional Example tire), and carried out performance tests on snow to evaluate acceleration performance (traction performance), braking performance (braking performance) and on-snow feeling performance.

The test tires will be explained below.

The Example tire is the pneumatic tire disclosed in FIG. 1 according to the first exemplary embodiment.

In comparison with the Example tire, the Conventional Example tire is a tire in which the circumferential direction block row of the center blocks is replaced with a center rib.

In comparison with the Conventional Example tire, a Comparative Example 1 tire is a tire in which the center rib is replaced with the circumferential direction block row of the center blocks, and in which ground contact edge sides of lug grooves do not reach blocks constituting the second blocks.

A Comparative Example 2 tire is a tire which does not have the sub-grooves of the Example tire.

In the present test examples, all of the tires were of a tire size of 265/70R16 and were mounted to a regular rim at regular internal pressure, and tests were carried out by actual vehicle running when fitted to a light truck and in a state of loading with a regular load. Here, the "regular rim" refers to a standard rim of applicable size as defined, for example, in the 2008 edition of the JATMA published YEAR BOOK, and the "regular load" and the "regular internal pressure" similarly refer to the maximum load and the air pressure for the maximum load for the applicable size/ply rating as defined in the 2008 edition of the JATMA published YEAR BOOK. In cases where TRA standards or ETRTO standards are applied to a location of use or manufacturing location, accordance is made to the respective standards.

In the present test examples, with respect to the acceleration performance, as starting performance, acceleration at full throttle from a state of rest was carried out, and the time (acceleration time) until 50 m were traveled on packed snow was measured.

Further, with respect to the braking performance, full braking was applied from a speed of 40 km/h to measure a braking distance until a state of rest was attained on packed snow, and an average deceleration was calculated from the aforementioned speed (40 km/h) and the braking distance.

Further, with respect to the on-snow feeling performance, overall evaluation of braking ability, starting ability, straight traveling ability and cornering ability on a test course with a packed snow road surface was carried out.

Then, for each of the acceleration performance, the braking performance and the on-snow feeling performance, an evaluation index of 100 based on the average deceleration of the Conventional Example tire was set, and evaluation indices serving as a comparative evaluation were calculated for the Example tire and the Comparative Example tires. The evaluation results are shown in Table 1.

TABLE 1

|  | Conventional Example | Comparative Example 1 | Comparative Example 2 | Example |
|---|---|---|---|---|
| On-Snow Braking Performance (Braking Performance) | 100 | 105 | 107 | 107 |
| On-Snow Acceleration Performance (Traction Performance) | 100 | 105 | 108 | 108 |
| On-Snow Feeling Performance | 100 | 102 | 103 | 110 |

In the evaluation results in Table 1, the larger the evaluation index is, the higher the on-snow performance is, that is, this indicates that the acceleration performance, the braking performance and the on-snow feeling performance are excellent. As can be understood from Table 1, the evaluation indices of the Comparative Example 1 and Comparative Example 2 tires were all higher compared with the Conventional Example tire. Further, the evaluation indices of the Example tire were all higher compared with the Conventional Example tire, the Comparative Example 1 tire and the Comparative Example 2 tire.

The invention claimed is:

1. A pneumatic tire comprising:
a pair of center circumferential direction grooves that are provided at both tire width direction sides with a tire equatorial plane interposed therebetween, and that extend in a tire circumferential direction;
a plurality of first lug grooves that connect one of the center circumferential direction grooves and the other of the center circumferential direction grooves, and that are inclined with respect to a tire width direction, directions of inclination of the plurality of first lug grooves being alternately in opposite directions in the tire circumferential direction, wherein groove widths of end portions of the first lug grooves at a first ground contact side are narrower than other portions of the first lug grooves;
a plurality of second lug grooves that are provided at both tire width direction sides with the tire equatorial plane interposed therebetween, extend from the center circumferential direction grooves to tread edge sides, and are inclined with respect to the tire width direction, directions of inclination of the plurality of second lug grooves being in opposite directions on one side and the other side in the tire width direction across the tire equatorial plane;
a pair of shoulder circumferential direction grooves that are provided at tire width direction outer sides of the center circumferential direction grooves with the tire equatorial plane interposed therebetween, extend in the tire circumferential direction, and delineate second blocks together with the center circumferential direction grooves and the second lug grooves; and
sub-grooves that traverse the second blocks in the tire circumferential direction to connect one of the second lug grooves and another of the second lug grooves, and that extend along a direction that is orthogonal to the direction of inclination of the second lug grooves.

2. The pneumatic tire of claim 1, wherein a groove width of the sub-grooves is set to be narrower than that of the center circumferential direction grooves and that of the shoulder circumferential direction grooves, and so as not to close at a time of contact with the ground.

3. The pneumatic tire of claim 1, wherein the sub-grooves on the one side and the sub-grooves on the other side in the tire width direction across the tire equatorial plane are arranged to be offset from each other in the tire circumferential direction, and, viewed from the tire width direction, at least a portion of the sub-grooves on the one side and at least a portion of the sub-grooves on the other side overlap with each other.

4. The pneumatic tire of claim 2, wherein the sub-grooves on the one side and the sub-grooves on the other side in the tire width direction across the tire equatorial plane are arranged to be offset from each other in the tire circumferential direction, and, viewed from the tire width direction, at least a portion of the sub-grooves on the one side and at least a portion of the sub-grooves on the other side overlap with each other.

* * * * *